United States Patent [19]

Young et al.

[11] 4,403,302
[45] Sep. 6, 1983

[54] AUTOMATIC RESETTING OF CONTROL SYSTEM FOR LOSS OF TIME REFERENCE

[75] Inventors: Glen C. Young; Michael B. Durant, both of Fort Wayne, Ind.

[73] Assignee: Essex Group Inc., Fort Wayne, Ind.

[21] Appl. No.: 202,104

[22] Filed: Oct. 30, 1980

[51] Int. Cl.³ .................. G06F 15/20; G06F 11/30; H05B 1/02
[52] U.S. Cl. ............................ 364/900; 219/492
[58] Field of Search ............ 219/10.55 B, 492, 506; 364/200 MS File, 900 MS File

[56] References Cited

U.S. PATENT DOCUMENTS 4,011,428  3/1977  Fosnough et al. .......... 219/10.55 B
4,158,432  6/1979  Van Bavel ................... 364/900 X

OTHER PUBLICATIONS

Smith, L., "A Watchdog Circuit for MC-Based System", Digital Design, Nov. 1979, pp. 78-79.

Primary Examiner—Thomas M. Heckler
Attorney, Agent, or Firm—Stephen A. Schneeberger

[57] ABSTRACT

In an electronic control system, as for instance, one employing a microcomputer, a timing reference signal supplied to the microcomputer, typically from the AC supply line, is monitored for continuity and integrity by determining whether that signal occurs or recurs some predetermined number of times relative to a measuring interval. The measuring interval is established by an event provided by the microcomputer and which recurs with a generally known time relationship to the timing reference signal. Failure of the timing reference signal to occur or recur within the measuring interval is interpreted as a failure of the timing reference, and a reset command is automatically executed to automatically reset or initialize the control system.

A display, for instance associated with an appliance such as a microwave oven, may be repetitively scanned at some normal interval in response to the programmed control of a microcomputer. The measuring interval for monitoring the timing reference may be established from the display scan signal and the monitoring operation may be performed with a program stored in the microcomputer.

14 Claims, 6 Drawing Figures

AUTOMATIC RESETTING OF CONTROL SYSTEM FOR LOSS OF TIME REFERENCE

DESCRIPTION

1. Technical Field

The present invention relates to electronic control systems and more particularly to microcomputer-based electronic control systems. More specifically, the present invention relates to automatically resetting such control systems upon detection that a timing reference associated with the control system has departed from a normal mode of operation.

2. Background Art

Electronic control systems and particularly such systems employing microprocessors or microcomputers, have enjoyed a rapid growth for use in controlling a variety of devices, including appliances, industrial controls, and the like. Frequently these control systems are required to perfrom complex control tasks in a very precise manner requiring an accurate timing reference. An unintended departure from the normal control routine may, at the least, complicate or prevent the attainment of the desired control objective, but in certain instances may pose an even more serious problem. For instance, microcomputer-based control of appliances such as microwave ovens, dishwashers, and the like has recently become relatively common, and the control sequences performed normally involve activating and deactivating certain load devices associated with the appliance. For example, the source of cooking energy in a microwave oven is partly or wholly derived from a magnetron, the activation of which is closely controlled in accordance with a program executed by a microcomputer. The duration of magnetron activation is based on a timing reference, normally derived from the frequency of the available AC line power, and the failure of the magnetron to turn off at the intended time could result in the oven's contents being over-cooked or burned.

Occasionally the timing reference signal may, for one reason or another, fail or be interrupted such that it is prevented from effecting the desired response of the microcomputer as a form of timer, and yet the microcomputer may continue through its program because the program timing comes from the system clock which is often independent of the timing reference and may be generated at the microcomputer.

Microcomputers include resetting circuitry and/or routines which, in response to a command signal generated upon powering-up the system, effect the clearing of certain data from memory, the initializing of a stored program sequence and correspondingly, the turnoff of certain load devices. In the event the user becomes aware that the timing reference is not functioning correctly, which detection may be difficult for the user, he may turn the system off and/or attempt to reset and restart it with the hope that the cause for the problem was only transitory and no longer exists. This requirement for human intervention is, however, unreliable and inconvenient.

DISCLOSURE OF INVENTION

Accordingly, it is a principal object of the invention to prevent a control system such as a microcomputer from controlling one or more load devices in an undesired or unsafe manner in the event a normal timing reference fails or is disrupted.

It is another object of the invention to restore the control system to a normal operating mode in the event of disruption of the timing reference. Included in this object is the provision of automatic resetting of the control system in response to the detection of disruption in the normal timing reference. More specifically, it is an object to effect said detection and said resetting of a microcomputer based control system in a manner which may be implemented via the programmed instructions for the microcomputer.

In accordance with the invention, provision is made for the automatic resetting of an electronic control system, especially one in which the signal processing is performed by a microcomputer employing a memory programmed with instruction words defining operating sequences implemented by control logic to provide control signals, and which includes the capability of being reset to some initial point in the program sequence from which a predetermined sequence of initializing operations is automatically initiated in response to the generation of a reset command. A timing reference signal supplied to the microcomputer, typically from the AC supply line, is monitored for continuity and integrity by determing whether or not that signal occurs or recurs some predetermined number of times relative to a measuring interval established by an event provided by the microcomputer and which recurs with a generally known time relationship to the timing reference signal. Failure of the timing reference signal to occur or recur within the measuring interval is interpreted as a failure of the timing reference and a reset command is automatically executed. The reset command is utilized to reset the control system to the aforementioned initial point, resulting in automatic resetting or initializing of the system from which normal operation may begin or resume if the circuitry is unharmed and the disruptive cause was transient.

The control system, in a preferred application, forms part of an appliance such as a microwave oven, and the resetting of the program sequence to its initial point is normally operative to terminate continued operation or activation of various load devices, such as a magnetron, associated with the appliance.

In one embodiment of the invention, a display associated with an appliance is repetitively scanned, in response to the programmed control of a microcomputer, at some normal interval, this display scan signal serving to establish the measuring interval for monitoring the timing reference. Specifically, the program stored, as in a read-only memory, includes certain instruction for repetitively monitoring the logic state of a square 60 Hz timing reference signal throughout a normal 60 Hz cycle, noting when a new cycle has been initiated and using that indication of a new cycle to reset a counter which was being incremented at each display digit scan signal. The counter's length is sufficient to output a system reset signal only if a new timing reference signal has not occurred within about 200-300% or more of its normal interval. The system reset or reset command is effective as a program instruction to effect the initializing of the system as previously mentioned.

BEST MODE FOR CARRYING OUT THE INVENTION

Figure 1:
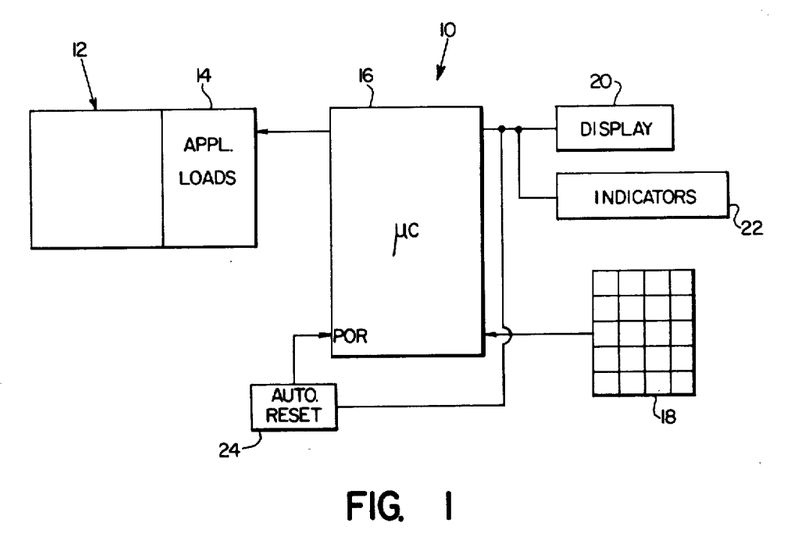
FIG. 1 is a generalized block diagram of a control system in accordance with the invention.

Referring to the drawings, there is illustrated in FIG. 1 a generalized control system 10 for an electrically controllable device, such as an appliance or the like, here represented by microwave oven 12. The oven 12 includes several components or loads, generally designated 14, which respond directly or indirectly to control signals from control system 10 to effect the operation of the oven appliance. For oven 12, the appliance loads 14 would include the magnetron, door latch, fan, stirrer, end of cycle buzzer, possibly a radiant browning element, etc. (none being shown).

The signal processing capability of control system 10 is preferably obtained with an integrally-formed microcomputer 16 which includes input, output and memory capabilities as well as the signal processing logic normally attendant to a microprocessor. The memory includes both read-only-memory (ROM) and random-access-memory (RAM) for respectively storing program instructions and both user-supplied and system generated data. An included program counter addresses the program instructions in the ROM in accordance with a particular control sequence, and the instructions are decoded in appropriate decoding circuitry and extended as control signals to other portions of the microcomputer. The control logic of the microcomputer includes an arithmetic logic unit (ALU) and an accummulator for the logical processing of data. The input and output circuitry may each be dedicated to a respective one of those functions or may singularly provide both functions by multiplexing. The system timing may be obtained with an internal clock derived from an internal oscillator or it may be provided from an external source.

Importantly, the microcomputer 16 also includes a resetting capability via the power-on-reset (POR) port. A Reset Command signal applied to the POR port will automatically set the program counter to a paticular starting or initial location and the various outputs from the microcomputer are set to a "float" state. This condition is maintained so long as the logic level of the Reset Command exists. Upon release, the program counter initiates the first instruction to be read from the ROM into the instruction decode logic. After executing that initial instruction, the program counter increments so that the second and subsequent instructions may be recalled from memory and executed, enabling a sequence of initializing operations to be automatically performed.

Data and certain functional commands may be entered by the user into the RAM of microcomputer 16 by various input devices, as for instance the matrix keyboard 18.

A character display 20 provides an indication of the time-of-day when the oven 12 is not in use and usually indicates the time remaining in a cooking cycle when it is in use. The display 20 is repetitively strobed or scanned by microcomputer 16 to display the relevant time data.

One or more indicator lights 22 controlled by microcomputer 16 serve to indicate various functional states of the control 16 and oven 12.

In accordance with an aspect of the invention, automatic reset command generating circuitry (ARCG) 24 is provided for detecting the failure of a particular anticipated event or function of microcomputer 16, which by inference indicates that the microcomputer is malfunctioning, and responding with the generation of a reset command signal which is applied to the power-on-reset port (POR) of microprocessor 16 to effect a resetting of the program to an initial point from which a sequence of initializing operations automatically occur. The signal or function monitored by the ARCG circuitry 24 may be, for instance, the display scan signal applied to display 20.

Figure 2:
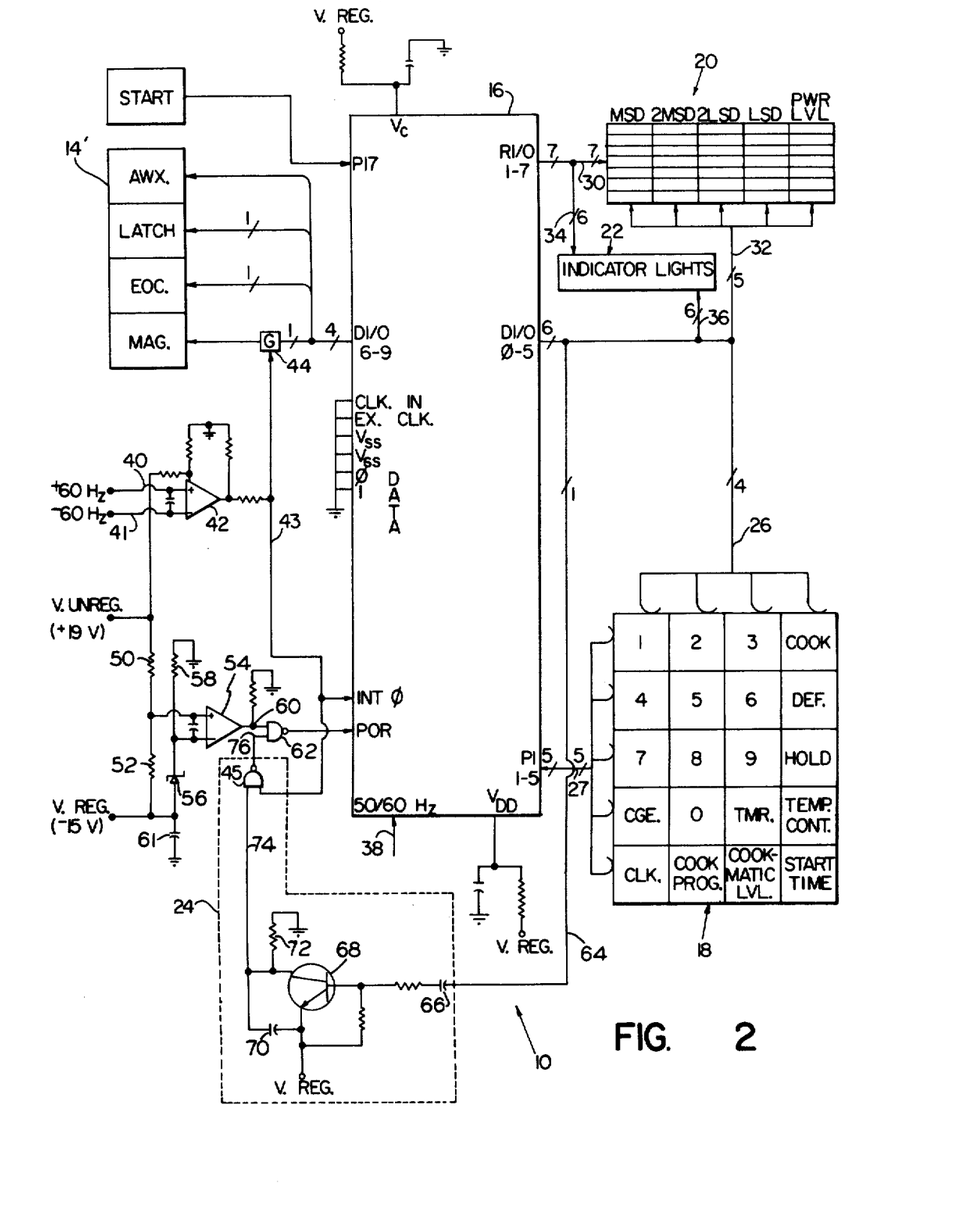
FIG. 2 illustrates the control system of FIG. 1 in greater detail, schematically depicting one circuit for effecting generation of an automatic reset command.

Referring now to FIG. 2 for a clearer understanding of the relevant circuitry of the invention, the microcomputer 16 illustrated is a PPS-4/1 one-chip microcomputer, series MM78 manufactured by Rockwell Microelectronic Devices, Anaheim, Calif. Additional details relating to the architecture, capabilities, and programming of the PPS-4/1 microcomputer may be found in a publication entitled "PPS-4/1 one-chip microcomputers, Series MM77, MM78 systems", copyrighted in 1977 by Rockwell International Corporation, and programming instructions may be found in an "Assembly Language Program Manual" for that same microcomputer and by that corporation. While the following discussion references the aforementioned PPS-4/1 device, it will be understood that the invention is similarly applicable to other microprocessor or microcomputers, such as the Intel 8022, National COP Series, Mostek 3870, Texas Instruments TMS 1000, etc. Moreover, a more detailed description of a generally similar control scheme for a microwave oven, absent a consideration of the present invention, will be found in U.S. Pat. No. 4,011,428 to Fosnough et al issued Mar. 8, 1977 for Microwave Oven Timer and Control Circuit, and assigned to the same assignee as the present invention, which description is incorporated herein by reference to the extent required for a better understanding of the control of a microwave oven and consistent with the present invention.

Numerical data and functional commands may be generated by appropriate actuation of the keys on a 20-key keyboard 18. Keyboard 18 comprises a 4×5 matrix strobed by the four leads 26 extending thereto from four of the six output ports DI/o ∅-5 of microcomputer 16. Actuation, by touch of a key or pad on the keyboard, serves to extend the appropriate value into microcomputer 16 on the appropriate one of five input leads 27 connected to input ports PI1-5 of the microcomputer.

A Start command signal may be maually generated separately from keyboard 18 and is extended to microcomputer port P17 for effecting the initiation of a programmed cooking sequence.

The control signals from microcomputer 16 for the various appliance loads 14 appear at plug 14' in FIG. 2, the actual load devices having been omitted. The MAG control signal determines whether or not the magnetron is activated. The EOC control signal activates a buzzer at the end of a timed cycle of operation. The LATCH control signal activates and releases a latch mechanism on the oven door. The AUX control signal activates both the fan and stirrer in the oven. These control signals appear on four leads extending from DI/O ports 6-9, A logic "1" signal at these ports is generally effective to activate the respective appliance load; however, when these outputs of microcomputer 16 are allowed to "float" as in response to a Reset Command, the output signals are pulled to a logic "0" level through external impedances (not shown) connected thereto from a logic "0" potential, i.e. −15V, thereby inactivating the appliance load.

The character display 20 is comprised of four 7-segment digit displays MSD, 2MSD, 2LSD and LSD, i.e. "most significant" to "least significant" digits, for displaying the time of day or the time remaining in a user programmed oven cycle. The display 20 also includes a separately located 7-segment digit display PWR LVL for numerically indicating the relative power level at which the magnetron is operating. Seven leads 30 are extended to the seven respective segment inputs of display 20 from seven respective output ports RI/O 1-7 of microcomputer 16. It will be understood that the value of a digit may have been expressed in a four-bit binary coded decimal form by the microcomputer and a suitable segment decoder (not shown) has translated that value to a 7-bit form.

Figure 3:
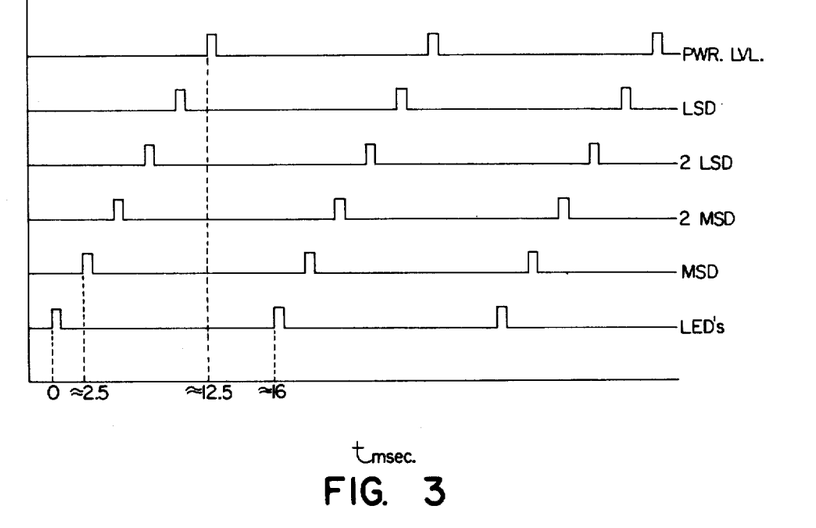
FIG. 3 is a timing diagram of the scan signals for the several display devices.

In a well known manner, each digit of display 20 is scanned or strobed in sequence by a strobe or scan pulse appearing on a respective one of five leads 32 extending to the respective five digits of the display such that the appropriate digits are lighted and extinguished in rapid sequence from one end of the display to the other. The individual segments of the display digits are preferably scanned and lighted at a repetition rate of about 50 Hz or more to avoid flicker detectable by the eye. The scan rate in the described embodiment is controlled by certain programmed instructions and thus indirectly by the internal clock of microcomputer 16. FIG. 3 depicts the relative timing of the display scan signals applied to each digit MSD, 2MSD, 2LSD, LSD and PWR LVL. The time data on the segment leads 30 is of course updated at a rate which corresponds with the display digit drives.

Six leads from output ports RI/O 1-7 and six more leads 36 from output ports DI/O Ø-5 are extended to eleven respective LED indicator lights for indicating that the control system status.

Considering now the AC and DC supplies associated with microcomputer 16 and/or oven 12, one of two particular voltage levels is applied via line 38 to the 50/60 Hz port to place the computer in either a 50 Hz or a 60 Hz operating mode, depending on the frequency of the available AC line power supply. For purposes of this discussion, it will be assumed that a 60 Hz line supply exists.

The 60 Hz supply, as derived from the centertapped secondary of a transformer (not shown) appears in 90° phase-shifted relation on terminals 40 and 41 and is extended to the "+" and "−" inputs respectively of a comparator 42, thereby forming a squaring circuit having as its output a squared 60 Hz waveform 43 having a 50% duty cycle. The squared 60 Hz waveform 43 is extended to gate 44 such that the start of the control signal for the magnetron bears a particular phase relation with the 60 Hz AC power supply to the magnetron. The squared 60 Hz waveform 43 is also extended to a port INTØ on microcomputer 16, as well as to an input to NAND gate 45 in ARCG circuitry 24. This "digitized" 60 Hz signal appearing at the INTØ port provides the basis for synchronizing various operations of the microcomputer 16 therewith, as for instance the various timing functions.

Referring now to the relatively conventional development of a Set (or Reset) Command signal by the microcomputer-based control system upon the initial turn-on of power or following a power outage, a source of unregulated voltage, $V_{unreg}$, i.e. about +19V, (not shown) is applied to one end of voltage divider comprised of resistors 50 and 52, with the other end having a source of regulated voltage, $V_{reg}$, i.e. −15V (not shown) applied thereto. The junction of resistors 50 and 52 is connected to the "+" input of a comparator 54 to establish the voltage for comparison to the Zener diode 56 at "−" input of comparator 54. The unregulated supply of voltage must go beyond a voltage thereby predetermined to terminate the Reset Command signal previously existing. The unregulated voltage is the supply for the regulator (not shown). The $V_{reg}$ from this regulator is applied to ground and to one end of Zener diode 56 having its other end connected to the "−" input of comparator 54 and through resistor 58 to ground. The terminal of Zener 56 having $V_{reg}$ applied thereto is also connected to high frequency bypass capacitor 61 having its opposite terminal connected to ground. The output 60 of comparator 54 is one state before $V_{unreg}$ is sufficient to maintain the $V_{reg}$ supply and is the other state thereafter, the former state being operative when and while extended through NAND gate 62 to provide a Reset Command signal to the POR port of microcomputer 16. Gate 62 effectively functions as an OR gate in that either too low an unregulated voltage indicated by a low signal 60 or a scan monitor fault signal 76, to be hereinafter described, will cause a Reset Command signal to appear at POR port and thereby effect a reset.

When the Reset Command signal terminates, the program counter automatically begins executing programmed instructions from the initial ROM address to which it was set by the Reset Command, those instructions defining a sequence of initializing operations which clear data from the RAM and insure that the microprocessor outputs to the appliance loads are disabled.

In addition to the aforementioned generation of a Reset Command signal in response to a power-turn-on condition at the initiation of operation of the system or following a power interrupt, ARCG circuitry 24 is provided in accordance with the invention to sense a malfunctioning of the microprocessor 16 itself, as resulting from electrical interference, and to automatically generate a Reset Command signal. Specifically, one of the display scan signals normally repetitively appearing at one of the output ports DI/OØ-5 at predetermined, substantially constant intervals is monitored to determine whether or not it occurs or recurs within some measuring or referenced interval at least as long as its normal recurrence interval. Preferably the display scan signal monitored is that which appears earliest in the normal scanning sequence of the digit in 20, that scan signal being represented by line 64 in FIG. 2. The scan signal 64 is AC coupled through capacitor 66 to the base of a transistor switch 68 for driving the normally non-conducting transistor 68 into conduction in response to a rising transition in the level of that signal. Such AC coupling prevents actuation of the transistor solely in response to a logic level to which the system might fail.

A reference interval time is established by an RC timing circuit employing timing capacitor 70 and resistor 72. One end of capacitor 70 is connected to $V_{reg}$ and to the emitter of transistor 68, and the other end is connected to the transistor's collector and through resistor 72 to ground. The voltage at the junction of capacitor 70 and resistor 72 provides the basis for the generation of a Reset Command signal and is extended to an input of NAND gate 45 via line 74. Capacitor 70 may have a value of about 0.22 mfd and resistor 72 a value of 2 megohm to thereby provide a suitable charging time constant. As seen on lead 74, capacitor 70 charges toward a voltage level which may result in or is representative of a Reset Command; however, its charging time constant is selected to be sufficiently long that a normally occurring scan pulse on lead 64 will switch on transistor 68 and thereby discharge the capacitor before it attains that level. Thus, each occurrence of the monitored scanning pulse serves as a reference and initiates a new timing interval. Normally the scanning pulse will recur at or near a fixed rate, typically in the frequency range of 60-100 Hz and the interval range of 16-10 msec, such that the measuring interval should exceed that value before generating the Reset Command signal. An exemplary measuring interval is 400 msec.

Apart from a consideration of the oscillatory gating afforded by the 60 Hz signal on lead 43 to NAND gate 45 and assuming a scan pulse does not occur to reset capacitor 70, the voltage on lead 74 will rise to a level which represents a change in logic state at the input to the NAND gate 45, which changed logic state effectively represents a Reset Command signal and could be applied directly to the POR port if of the correct polarity. For polarity correction, occasioned by the type of logic used, however, that Reset Command signal is extended from gate 45 to the POR port via lead 76 and gate 62.

Moreover, to allow the microcomputer 16 to assume a fully operational status in which display scanning pulses are again provided following the clearing of RAM and turn-off of certain outputs during the initial phase of a reset sequence, it is necessary to discontinue the logic level of the Reset Command signal applied through POR port to the program counter for sufficient time for a scanning pulse to be generated to discharge capacitor 70. This delay or removal of the Reset Command is conveniently achieved by gating the passage of the signal on lead 74 through gate 45 to lead 76 with the 60 Hz square wave on lead 43. Thus, for about 8 msec of every 16 msec the gate 45 is prevented from passing any Reset Command signal which might appear at its other input, thereby affording sufficient time for operation of microcomputer 16 to be restored if the initial cause of its disruption has passed and it has not been damaged.

Because of the instability of the internal clock ($\pm 50\%$), the timing of certain of the various control sequences is derived from or synchronized by the 60 Hz square wave drive from the AC supply. It is therefore important that the 60 Hz (or 50 Hz, depending on locality) timing reference signal be continuously and accurately provided to microcomputer 16 if the timing functions are to be performed accurately. The interruption or distortion of this 60 Hz timing reference signal, either in the external circuitry connected to the INT∅ port or after being received in the microcomputer 16, can give rise to some of the problems previously mentioned, such as extending a cooking cycle beyond its intended completion and thereby burning the oven's contents. Moreover, interruption of this timing reference signal need not necessarily interrupt the correct generation of display scanning pulses, thereby preventing total reliance on the aforedescribed circuitry to also detect and reset for loss of the timing reference. Accordingly, an important aspect of the invention is the recognition of such problems in the timing reference signal and the remedial action taken.

In an effort to prevent the problems which might result from the loss of the time reference, provision is made for terminating the various controlled functions, as for instance, de-energizing the magnetron, in the event a loss of the time reference is detected. This is done by monitoring the timing reference signal and effecting a resetting of the microcomputer 16 if the timing reference fails to occur or recur within some measuring interval during which it should have occurred. As previously described, the resetting operation at least terminates the control which activated the appliance loads and may also restore the system to an operating state if the fault was only temporary. This monitoring and resetting is preferably effected by the instructions programmed in ROM without need to resort to circuitry external to the microcomputer 16. This has the advantage of detecting failures in the timing reference signal which only manifest themselves internally of the microcomputer. Moreover, this monitoring and resetting function preferably coexists with but is effectively independent of the ARCG circuitry 24 located externally of the microcomputer 16, such that a Reset Command is generated and a reset effected for problems caused by a loss of timing reference and/or for problems caused by a loss of microcomputer functionality independent of the timing reference.

Figure 4A:
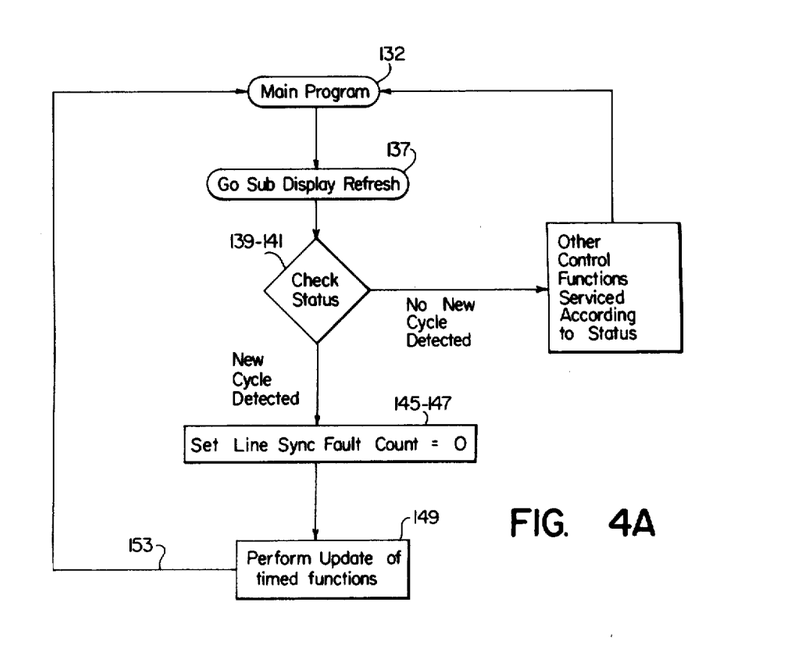
FIGS. 4a, 4b and 4c are logic flow chart diagrams of processing steps incorporated in two subroutines and an initial portion of the main routine and two separate routines of the programmed instruction sequences.
Figure 4B:
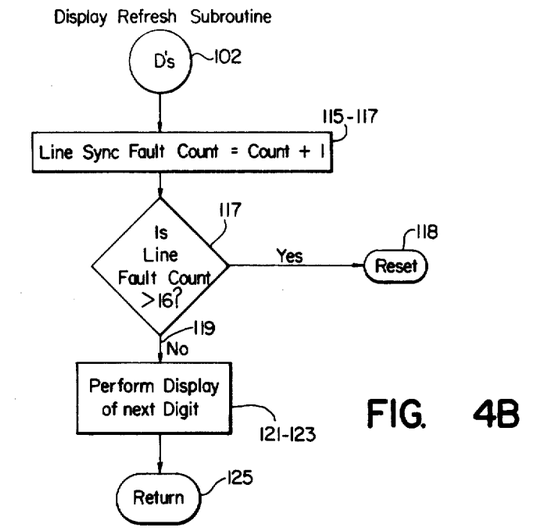
Figure 4C:
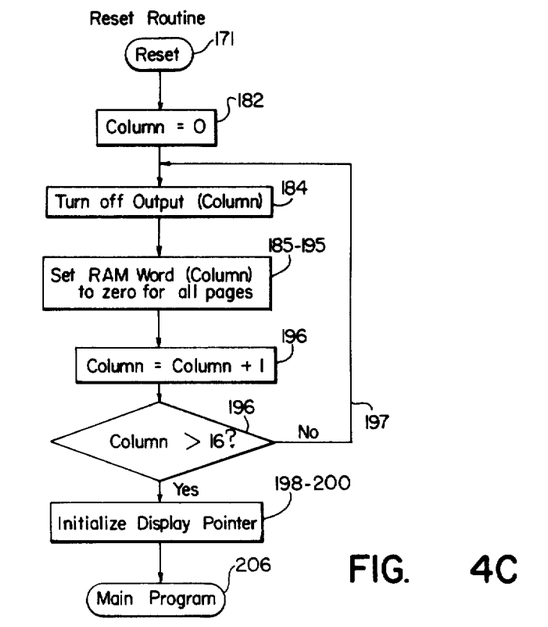

In a preferred embodiment illustrated by the flow diagrams of FIGS. 4a, 4b and 4c, the detection of a loss of the timing reference, i.e. the 60 Hz line signal, and its response of resetting the microcomputer 16 appears in greater detail. Generally speaking, the squared 60 Hz line signal is monitored internally of microcomputer 16 to detect the occurrence of each new cycle and if that signal fails to occur within some predetermined interval, or interval range, longer than the normal interval for recurrence of that timing signal, a programmed instruction to reset the microcomputer 16 is called and the microcomputer is thereby reset and its outputs to the appliance loads are deactivated.

As previously mentioned, each digit of display 20 is normally refreshed about 60 times per second by its respective scan pulse. The instructions which effect such refresh of the display are monitored and counted to provide the measuring interval. The scan pulses are controlled by the on-board timing of the microcomputer 16, and thus are subject to the drift which may occur in that internally generated timing. However, because these scan pulses are generated by the computer's internal clock and programming, they are substantially independent of the 60 Hz timing reference from the line supply except for possible total cessation of operation of the computer which would be occasioned if the DC supply thereto is dependent on the AC supply. Therefore, the display scan provides a convenient basis from which to derive the measuring interval against which the 60 Hz timing reference is monitored.

The following is an extract of the program listing for the program employed with microcomputer 16, which extract embraces the monitoring of the 60 Hz reference and the Reset Response occasioned by failure of that reference. Line number references shown are also used for reference in FIGS. 4a through 4c, with the reference numerals 117 and 196 each appearing in two places in the figures because the particular microcomputer 16 effects each pair of illustrated functions with single instructions.

```
101:   ;******      PRIMATIVE SUBROUTINE PAGE
102:   REFRSH:
103:   ;*****       DISPLAY REFRSH ENTRY POINT
104:   ;*    THIS ROUTINE CONTROLS THE DISPLAY OF THE
             DISPLAY IMMAGE DATA
105:   ;*    THE 60HZ SYNC LINE IS MONITORED AND APPRO-
             PRIATE FLAGS SET WHEN A
106:   ;*    VALID LINE CYCLE IS DETECTED.
107:   ;*
108:   ;*    KEYBOARD DATA IS READ AND STORED INTO THE
             APPROPRIATE LOCATIONS,
109:   ;*    AND A 'NO 60 HZ' FAULT COUNTER IS MAINTAINED
             BY THIS ROUTINE
110:
111:          *
112:          *
113:          *
114:
115:          LB      03H            ;SERVICE 60 HZ FAULT TIMER
116:          LA
117:          AISK    01H            ;INCREMENT 60 HZ FAULT
                                      TIMER
118:          TL      POR            ;NO 60 HZ SIGNAL, RESET
                                      THE CONTROL
119:          X                      ;60 HZ OK, CONTINUE
120:
121:          *
122:          *
123:          *
124:
125:          RT
132:   MAIN
133:   ;*****       MAIN LINE ROUTINE
134:   ;*    THIS CODE DETERMINS WHICH FUNCTION MOST NEEDS
             SERVICING AND THEN
135:   ;*    SERVICES THAT FUNCTION.
136:
137:          TM      REFRSH         ;NEXT DISPLAY DIGIT
138:
139:          *
140:          *
141:          *
142:
143:   ;******      AT LEAST ONE LINE CYCLE ELAPSED
144:   ;*    SERVICES ALL OF THEN REAL TIME FUNCTIONS.
145:          LB      03H
146:          LAI     00H
147:          X                      ;RESET THE LINE SYNC FAULT
                                      COUNTER
148:
149:          *
150:          *
151:          *
152:
153:          T       MAIN           ;NEXT MAIN FUNCTION
154:
167:
168:
169:
170:          ORG     3C0H
171:   POR:
172:   ;*****       POWER ON RESET ENTRY POINT
173:   ;*    THIS IS THE PLACE THE POWER ON RESET HARDWARE
             STARTS
174:   ;*    EXECUTION. THE TEST ROUTINE BEGINS HERE.
175:
176:          NOPP                   ;REQUIRED FOR PROCESSOR
                                      RECOVERY
177:
178:          *
179:          *
180           *
181:
182:          LB      00H
183:   CLR:
184:          ROS                    ;TURN OUTPUT PORTS OFF
                                      (ONLY IF B=0 NO PORTS AT
185:          EOB     04H            ;POINT TO PAGE 4
186:          LAI     00H
```

-continued

| | | | |
|---|---|---|---|
| 187: | X | ØIH | ;CLEAR PAGE 4, POINT TO PAGE 5 |
| 188: | | | |
| 189: | * | | |
| 190 | * | | |
| 191: | * | | |
| 192: | | | |
| 193: | LAI | ØØH | |
| 194: | X | Ø3H | ;CLEAR PAGE 3, POINT TO PAGE Ø |
| 195: | LAI | ØØH | |
| 196: | XNSK | | ;COLUMN CLEAR, MORE COLUMNS? |
| 197: | T | CLR | ;YES, DO NEXT COLUMN |
| 198: | LB | ØIH | |
| 199: | LAI | Ø2H | |
| 200: | X | | ;NO, SET DISPLAY POINTER FOR TIME OF DAY |
| 201: | | | |
| 202 | * | | |
| 203: | * | | |
| 204: | * | | |
| 205: | | | |
| 206: | TL | MAIN | |

Referring to FIG. 4a, an abbreviated flow chart of the Main Program portrays in gross detail the operations relevant to the implementation of the invention. The Main Program 132 proceeds to GO SUB Display Refresh instruction 137 described hereinafter in greater detail with reference to FIG. 4b. Upon normal completion of the subroutine initiated by instruction 137, a display digit will have been refreshed and the Main Program proceeds to Check Status 139-141 (instructions not shown). If the status check indicates that no new cycle of the timing reference was detected, the program performs other control functions according to status requirements (instructions not shown). If the status check indicates a new cycle of timing reference is detected, the program performs instructions 145-147, which set the line sync fault count equal to zero. The performance of update of timed functions (149) follows (instructions not shown) with the final return to Main Program art instruction 153.

Both paths of interest ("No New Cycle" or "New Cycle") return to Main Program 132; and thereby lead to a continuous repetition of Display Refresh 136 and Check Status 139-141. The interval between calls for successive Display Refresh subroutines is determined by the internal timing of microcomputer 16 and the number of instructions that are performed between subroutine calls. Where the loop of instructions described in FIG. 4a does not match the number of instructions that need to be performed in the required interval for acceptable display appearance, additional calls to Display Refresh or additional instructions are inserted as required. The interval between Display Refresh calls corresponds with the interval between rising (or falling) edges of successive digits in the display during a scan of the display, the interval between successive digits refreshes being about 1.5 to 2.7 msec, with about 2.5 msec having been illustrated in FIG. 3. The interval between successive Check Status routines must be less than the interval for one cycle of the line frequency, i.e. less than 16 msec for 60 Hz line frequency, and is typically about 2.5 msec which corresponds with a repetition rate of about 400 per second. Thus, the Check Status routine is performed about 6 times per line frequency cycle.

Referring to the Check Status routine depicted in FIG. 4a, instructions 139-141 ask whether or not a new cycle of the monitored timing reference signal (60 Hz square wave) has occurred. This is accomplished by logic in the Display Refresh Subroutine which is sensitive to the logic state of the 60 Hz square wave and which requires two changes in the logic state to signify that a new cycle has begun. If a new cycle has not begun, the program performs other control functions as required. However, if a new cycle is detected, instructions 145-147 set a Line Sync Fault Count to Ø and the instructions suggested at 149 update any and all of the time counts which are to be updated by each cycle of the line frequency. These latter counts typically relate to the various timing and time-of-day functions of the control system. Then instruction 153 returns to the Main Program.

Referring to the Display Refresh subroutine depicted in more detail in FIG. 4b, DS1Ø2 corresponds with the instruction 137 of FIG. 4a. Upon entering the subroutine, instructions 115-117 command a Line Sync Fault Counter to increase its count by 1. Then instruction 17 asks whether or not the count in the Display Scan Counter exceeds a count of 16. The Line Sync Fault Counter is a 4-bit register in the random access memory and an overflow or carry bit from its incrementing conveniently indicates that a count of 16 has been exceeded. Under normal circumstances in which the 60 Hz timing reference is being detected, the instructions 145-147 to Set Line Sync Fault Counter to Ø should occur about once for each six occurrences of the Check Status routine or about once every 16-18 msec, during which interval the Line Sync Fault Counter should have attained a count of about 6-8, but substantially less than 16. Assuming this normal operation in which the Line Sync Fault Counter does not exceed 16, (not shown) instructions 121-123 of the Display Refresh subroutine are then called to effect display of the next digit in the display sequence, as by extending appropriate segment data and an appropriate scan pulse to the particular digit of the display. Then instruction 125 returns to the Main Program.

In the event the Display Scan Count does exceed 16, thereby signifying that the monitored timing reference did not recur within the measuring interval and that a fault therewith probably exists, an instruction 118 to Reset is issued.

Referring to FIG. 4c, there is illustrated the flow chart for the Reset routine. The instruction 118 to reset the microcomputer 16 commands the initiation of instructions beginning at 171. The pointer to the words in the random access memory and to the output port (column) is set to zero by instruction 182. Instruction 184 sets the output port designated by Column, to zero. The instructions 185-195 (not all shown) set the word designated by Column for each page of memory (the number of pages differ according to the size of the microcomputer) to zero. Column is incremented and tested at 196, and if not greater than 16 the sequence is repeated for the next greater Column value by the branch at 197 back to instruction 184. If Column is greater than 16, the display pointer is initialized at 198-200 to point to the location in RAM of the data for display (in this example, the time of day). The return to the Main Program is performed by instruction 206.

Finally the Main Program, represented as beginning at FIG. 4a, 132 is entered at these initialized conditions from which new or renewed operation may begin, as by the user entering time-of-day data and cooking function data into RAM via keyboard 18. The foregoing turn-off of outputs and the 0-setting of RAM is accomplished by the programmed direction of control signals to the outputs to place them in a floating state and by entering all 0's into RAM. In the instance of a Reset Command generated by ARGC 24 and extended to the POR port, the outputs are turned off and the program pointer is set to start at 171 directly by a single signal extended concurrently to each. Removal of the Reset Command generated by ARGC 24 permits execution of instructions beginning at 171. From this, it will be appreciated that the Reset Command generated externally and the Reset Instruction generated internally of microcomputer 16 have the same effect of terminating outputs, clearing RAM and initializing certain pointers or counters for renewing operation of the microcomputer from substantially the same point.

Thus, it will be seen that the described control system has the capability for responding to a loss of functionality of the microcomputer and/or to a loss of the timing reference in a manner which at least places the microcomputer outputs to the appliance loads in a safe (inactive) state and restores or attempts to restore the system to an operational status.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of our invention that which we claim as new and desire to secure by Letters Patent of the United States is:

1. In an appliance control system for controlling the operation of electrical control signal responsive means associated with an appliance, the control system including input means for entering functional electrical commands, electrical signal processing means connected to the control signal responsive means and receiving input commands from the input means, the signal processing means containing a programmed memory for storing instruction words which define operating sequences for the control signal responsive means, the signal processing means further including logic means for sequentially executing the instruction words to provide control signals to operate the control signal responsive means in response to commands from the input means, means for supplying to the signal processing means a normally repetitive first signal to provide a timing reference therefor, the signal processing means being programmed to provide a recurring event, said event normally recurring substantially independently of but with a time relationship to the first signal, said time relationship being within a known limited range, and the signal processing means also including means responsive to a reset command extended thereto or setting the execution of the programmed instruction words to a predetermined initial point in the programmed sequence from which a predetermined sequence of initializing operations is automatically initiated, the improvement comprising:

means automatically responsive to said first signal failing to occur within a certain measuring interval determined by said event for providing a reset command and extending said reset command to said means for setting the execution of the programmed instruction words to said initial point.

2. The control system of claim 1 wherein said measuring interval is determined by the cumulative intervals of plural successive ones of said events.

3. The control system of claim 1 wherein the repetition rate of said first signal is directly proportional to the frequency of and is derived from the available AC line power supply.

4. The control system of claim 2 wherein the repetition rate of said first signal is directly proportional to the frequency of and is derived from the available AC line power supply.

5. The control system of claim 4 wherein at least one of said signal control responsive means comprises display means, one of said control signals provided by said signal processing means comprises a scan signal normally repetitively applied to a said display means for controlling the display of data thereby, said scan signal corresponding with said event.

6. The control system of claim 5 wherein said control signal responsive means additionally comprises at least one means for actively controlling operation of the appliance, said at lest one active means having active and inactive functional states, and said at least one active means being placed in said inactive state by said initializing operations initiated when said program sequency is set at said predetermined initial point.

7. The control system of claim 6 wherein said appliance is a microwave oven and said at least one active means comprises a source of cooking energy.

8. The control system of claim 7 wherein said signal processing means comprises an integrally-formed microcomputer having input and output ports, at least some of said output ports being connected with said control signal responsive means to extend said control signals thereto and at least some of said input ports receiving input commands from said input means, and wherein said means for providing a reset command is substantially entirely integrally incorporated with said microprocessor and includes a sequence of said instruction words in said memory.

9. The control system of claim 8 wherein said signal processing means is programmed to provide at an externally accessible location of said microcomputer a specific signal normally occurring within a particular time interval relative to a certain reference and further including separate means automatically responsive to said normally occurring specific signal failing to occur at said location within said particular time interval relative to said certain reference for generating a reset command signal and extending said reset command signal to said means for setting the execution of the programmed instruction words to said initial point, said separate means for generating a reset command signal being located externally of and connected to said microcomputer.

10. The control system of claim 1 wherein said signal processing means includes counting means and said certain measuring interval is determined by said counting means responding to each incidence of said event to increase its count by a unit, said counting means being reset each time a said first signal recurs before said counting means overflows, said counting means overflow occurring at an event interval count exceeding the normal interval between successive first signals and providing said reset command.

11. The control system of claim 10 wherein said signal processing means comprises an integrally-formed microcomputer having input and output ports, at least some of said output ports being connected with said control signal responsive means to extend said control signals thereto and at least some of said input ports receiving input commands from said input means, and wherein said means for providing a reset command is substantially entirely integrally incorporated with said microprocessor and includes a sequence of said instruction words in said memory.

12. The control system of claim 10 wherein said signal processing means is programmed to provide at an externally accessible location of said microcomputer a specific signal normally occurring within a particular time interval relative to a certain reference and further including separate means automatically responsive to said normally occurring specific signal failing to occur at said location within said particular time interval relative to said certain reference for generating a reset command signal and extending said reset command signal to said means for setting the execution of the programmed instruction words to said initial point, said separate means for generating a reset command signal being located externally of and connected to said microcomputer.

13. In an appliance control system for controlling the operation of electrical control signal responsive means associated with an appliance, the control system including input means for entering functional electrical commands, electrical signal processing means connected to the control signal responsive means and receiving input commands from the input means, the signal processing means containing a programmed memory for storing instruction words which define operating sequences for the control signal responsive means, the signal processing means further including logic means for sequentially executing the instruction words to provide control signals to operate the control signal responsive means in response to commands from the input means, means for supplying to the signal processing means a normally repetitive first signal to provide a timing reference therefor, the signal processing means being programmed to provide a recurring event, said event normally recurring substantially independently of but with a time relationship to the first signal, said time relationship being within a known limited range, and the signal processing means also including means responsive to a reset command extended thereto for setting the execution of the programmed instruction words to a predetermined initial point in the programmed sequence from which a predetermined sequence of initializing operations is automatically initiated, the method for automatically initializing the control system in response to a certain fault in said first signal comprising the steps of:

monitoring said first signal and providing an indication of each new cycle thereof;

initiating a new finite measuring interval in response to each indication of a new cycle of said first signal;

generating a reset command whenever said measuring interval times out, said measuring interval timing out over an interval longer than the normal interval between successive cycles of said first signal; and applying said reset command to said means for setting the execution of the programmed instruction words to said initial point.

14. The method of claim 13 wherein said signal processing means comprises an integrally-formed microcomputer having input and output ports, at least some of said output ports being connected with said control signal responsive means to extend said control signals thereto and at least some of said input ports receiving input commands from said input means, and wherein each of said steps is implemented by certain of said stored instruction words defining respective program sequences.

* * * * *